United States Patent Office 2,951,790
Patented Sept. 6, 1960

2,951,790
RISTOCETIN RECOVERY AND AROMATIC ALDE-
HYDE DERIVATIVE OF RISTOCETIN

Charles A. Stainbrook, Waukegan, Ill., assignor to Abbott
Laboratories, North Chicago, Ill., a corporation of Illinois No Drawing. Filed Aug. 20, 1957, Ser. No. 679,130

10 Claims. (Cl. 167—65)

The present invention relates to a new compound of the antibiotic ristocetin and to the use of said compound for the recovery and purification of the antibiotic ristocetin.

Ristocetin is an antibiotic product having bactericidal activity against gram-positive organisms and is produced by the actinomycete *Nocardia lurida* in accordance with the process described in U.S. patent application S.N. 373,692, filed August 11, 1953. The antibiotic product of the above process can be resolved into two very similar antibiotics which have been designated ristocetin A and ristocetin B which are described in detail in U.S. patent applications S.N. 639,505, filed February 11, 1957, and S.N. 623,589, filed November 21, 1956, respectively.

Heretofore it has been considered necessary in order to recover and purify the antibiotic product ristocetin, to adsorb the antibiotic on an ion exchange column and thereafter elute the antibiotic which is obtained in a more purified form. The use of ion exchange columns, however, adds materially to the cost of the product and is not particularly suited for large scale production methods. It is therefore highly desirable to simplify the process of recovery and purification of ristocetin by eliminating the necessity of using an ion-exchange resin column.

It is therefore an object of the present invention to provide a compound of ristocetin which is sparingly soluble in water.

It is a still further object of the invention to provide a compound of ristocetin which greatly facilitates recovery of the ristocetin from its fermentation beer as well as from the more purified solutions thereof.

Other objects of the invention will be apparent from the detailed description and claims to follow.

It has been found that ristocetin and its components ristocetin A and ristocetin B in the form of a base or as a water-soluble salt will react with salicylaldehyde or cinnamaldehyde to give a definite compound which resembles a Schiff base and which is very sparingly soluble in water. The compounds of the present invention are prepared by adjusting an aqueous solution of a salt of ristocetin, such as the sulfate, to a pH of about 7 to 8 and preferably 7.5–8.1, with powdered sodium bicarbonate, sodium hydroxide, or other alkaline reagent. Cinnamaldehyde or salicylaldehyde is added and the product separates from solution after stirring a short time at room temperature. The product is filtered, washed with water and vacuum dried at 40–60° C.

In the following examples are shown several specific embodiments of the present invention but it should be understood that the invention is not to be limited to the specific reactions disclosed nor to the precise proportions or conditions set forth in the several specific examples, since the examples are given only for the purpose of illustrating the principle of the present invention.

*Example I*

One gram of ristocetin A was dissolved in water up to a volume of 100 ml. Ten milliliters of this solution was withheld for assay purposes and found to have a potency of 902 u./mg. Ninety milliliters of the said solution was adjusted to pH 7.6 with powdered sodium bicarbonate. Salicylaldehyde, 0.5 ml., was added and stirred for one hour. The yellow solid which separated was filtered, washed with water and vacuum dried at 40° C. The yield was 0.88 grams of a product which assayed 887 u./mg. and contained 8.0% moisture and 0.05% ash. This represents a recovery of 99.5%. The product decomposed at a temperature of about 250° C. On chemical analysis of the product which theoretically contains three salicylaldehyde groups per molecule of ristocetin, the following results were obtained:

|  | C | H | N | O |
|---|---|---|---|---|
| Theory_____percent__ | 57 | 5.90 | 4.5 | 32.6 |
| Found_____do____ | 57.19 | 5.78 | 4.2 | 32.54 |

The product was found to be soluble in polyethylene glycol, propylene glycol, aqueous acetone, aqueous methanol, aqueous ethanol pyridine, formamide and in water saturated with butanol and insoluble in amyl acetate, ethyl acetate, acetone, benzene, diethyl ketone, diethyl carbonate, chloroform, methylene chloride and butanol. Bio-assays on the product were obtained by dissolving the compound in 50% methanol.

*Example II*

One gram of ristocetin B was dissolved in water up to a volume of 100 ml. Ten milliliters of this solution was withheld for assay purposes and found to have a potency of 920 u./mg. Ninety milliliters of the remaining solution was adjusted to pH 7.6 with powdered sodium bicarbonate and 0.5 ml. of salicylaldehyde was added and stirred for one hour at room temperature. The yellow solid which separated was filtered, washed with water and vacuum dried at 40° C. The yield was 0.84 gram of product which assayed 753 u./mg. and contained 1.66% moisture and 0.11% ash. The product melted with decomposition at a temperature of about 250° C. On chemical analysis of the product which theoretically contains three salicylaldehyde groups per molecule of ristocetin, the following results were obtained:

|  | C | H | N | O |
|---|---|---|---|---|
| Theory_____percent__ | 58 | 5.7 | 5.0 | 31.3 |
| Found_____do____ | 58.59 | 5.60 | 5.1 | 30.74 |

*Example III*

Nine liters of a filtered ristocetin beer which assayed 219 u./ml. was adjusted to pH 7.7 with sodium bicarbonate and stirred well while adding 90 ml. of salicylaldehyde. Stirring was continued for one and one-half hours. Sodium chloride (400 grams) was added and stirred for one hour. The yellow colored product was filtered with the aid of Hyflo and the spent beer assayed 46 u./ml. The Hyflo cake was washed with a small amount of water and then slurried in water, adjusting to pH 3 with 6 normal $H_2SO_4$. The suspension was filtered, washed with water. Assays on the filtrate indicated a product which had a potency of 407 u./mg.

*Example IV*

Fourteen liters of a clear and nearly colorless solution of ristocetin sulfate which assayed 3900 u./ml. and indicated a potency of 455 u./mg. was adjusted to pH 7.6 with powdered sodium bicarbonate. Fifty-seven grams of salicylaldehyde was added and stirred for one and one-half hours. The bright yellow solid which separated was filtered, washed with water and vacuum dried at 40° C. The yield was 50 grams of a product which assayed 732 u./mg.

*Example V*

Three grams of the ristocetin salicylaldehyde compound which assayed 630 u./mg. was suspended in 10 ml. of water and acidified with 1 ml. of 6 normal $H_2SO_4$. The solution was added to 190 ml. of acetone and agitated. The grainy type of product was filtered, washed with acetone and vacuum dried at room temperature. The yield of ristocetin sulfate was 3.12 grams which assayed 673 u./mg.

*Example VI*

Five grams of the compound of ristocetin salicylaldehyde which assayed 732 u./mg. was suspended in 50 ml. of water and adjusted to pH 2.0 with 6 normal $H_2SO_4$. Chloroform was added and the salicylaldehyde was extracted into the lower phase. Two additional extractions were made with chloroform and the chloroform extracts were combined to give a volume of 24 ml. The amount of salicylaldehyde was determined by ultra-violet adsorption and was 17 mg./ml. which gives a total amount found to be 408 mg. The calculated value for the combination of three moles of salicylaldehyde with ristocetin is 428 mg.

*Example VII*

Three liters of a ristocetin solution of the sulfate which assayed 3900 u./ml. and indicated a potency of 455 u./mg., was adjusted to pH 8.1 with sodium hydroxide solution. Salicylaldehyde (10 ml.) was added and stirred for one and one-half hours. The product was filtered, washed with water and vacuum dried at 60° C. The yield of product was 12 grams which assayed 795 u./mg. The recovery was 80.5%.

*Example VIII*

One liter of an aqueous solution of ristocetin sulfate which assayed 3900 u./ml. was adjusted to pH 7.7 with powdered sodium bicarbonate. Ten ml. of cinnamaldehyde was added and the solution was stirred for one and one-half hours. The product which separated was filtered, washed with a small amount of water and vacuum dried at 40° C. The bio-assay on the slightly yellow colored compound was 474 u./mg. The product contained 2.75% moisture and 0.06% ash. A 92% recovery of the ristocetin activity was obtained.

By "ristocetin antibiotic" is meant a microbiologically active product formed by the deep culture fermentation of the organism *Nocardia lurida* in a nutrient media. The term includes ristocetin A and ristocetin B.

Others may readily adapt the invention for use under various conditions of service, by employing one or more of the novel features disclosed or equivalents thereof. As at present advised with respect to the apparent scope of my invention, I desire to claim the following subject matter.

I claim:
1. A process for the recovery of ristocetin in a more purified form from aqueous solutions thereof which comprises adjusting an aqueous solution of a ristocetin antibiotic to a pH between about pH 7 and 8, adding to said aqueous solution an aromatic aldehyde selected from the group consisting of salicylaldehyde and cinnamaldehyde with agitation to precipitate the ristocetin antibiotic as a sparingly water-soluble compound, suspending the said sparingly water-soluble ristocetin antibiotic compound in an aqueous solution having the pH thereof adjusted to an acidic pH, removing from the aqueous solution the said aromatic aldehyde which is released in the acidic aqueous solution, and recovering the said ristocetin antibiotic.

2. A process as defined in claim 1, wherein the said antibiotic is ristocetin A.

3. A process as defined in claim 1, wherein the said antibiotic is ristocetin B.

4. A process as defined in claim 1, wherein the said aldehyde is salicylaldehyde.

5. A process as defined in claim 1, wherein the said aldehyde is cinnamaldehyde.

6. A substantially water insoluble reaction product produced by mixing in a solvent for ristocetin one molecular proportion of a ristocetin antibiotic selected from the group consisting of ristocetin A and ristocetin B with three molecular proportions of an aromatic aldehyde selected from the group consisting of salicylaldehyde and cinnamaldehyde.

7. The substantially water insoluble reaction product produced by mixing in a solvent for ristocetin one molecular proportion of ristocetin A with three molecular proportions of salicylaldehyde.

8. The substantially water insoluble reaction product produced by mixing in a solvent for ristocetin one molecular proportion of ristocetin A with three molecular proportions of cinnamaldehyde.

9. The substantially water insoluble reaction product produced by mixing in a solvent for ristocetin one molecular proportion of ristocetin B with three molecular proportions of salicylaldehyde.

10. The substantially water insoluble reaction product produced by mixing in a solvent for ristocetin one molecular proportion of ristocetin B with three molecular proportions of cinnamaldehyde.

References Cited in the file of this patent

FOREIGN PATENTS 707,332    Great Britain _____ Apr. 14, 1954

OTHER REFERENCES

Fraenkel-Conrat et al.: Proc. Soc. Exp. Biol. and Med., vol. 63, 1946, pp. 302–308.

Phillip et al.: Antibiotics Annual, 1956–57, 1956, pp. 699–705.